United States Patent [19]

Kanota et al.

[11] Patent Number: 4,885,646
[45] Date of Patent: Dec. 5, 1989

[54] DIGITAL RECORDER USING PARTIAL RESPONSE METHOD

[75] Inventors: Keiji Kanota; Takahito Seki, both of Kanagawa, Japan

[73] Assignee: Sony Corporation, Tokyo, Japan

[21] Appl. No.: 248,113

[22] Filed: Sep. 23, 1988

[30] Foreign Application Priority Data

Oct. 15, 1987 [JP] Japan .................................. 62-260602

[51] Int. Cl.⁴ .................................................. G11B 5/09
[52] U.S. Cl. ........................................... 360/46; 360/40
[58] Field of Search ..................................... 360/46, 40

[56] References Cited

U.S. PATENT DOCUMENTS

| | | | |
|---|---|---|---|
| 4,234,898 | 1/1980 | Nakagawa et al. | 360/40 |
| 4,367,495 | 1/1983 | Mita et al. | 360/40 |
| 4,495,528 | 1/1985 | Sasamura et al. | 360/46 |
| 4,504,872 | 3/1985 | Peterson | 360/40 |

Primary Examiner—Vincent P. Canney
Assistant Examiner—Kevin J. Fournier
Attorney, Agent, or Firm—Hill, Van Santen, Steadman & Simpson

[57] ABSTRACT

A digital recording and reproducing system for ME tape uses a class 4 partial-response encoder in the recording apparatus and a corresponding decoder in the reproducing apparatus. A high signal-to-noise ratio is achieved without the need for a phase equalizer.

2 Claims, 2 Drawing Sheets

DIGITAL RECORDER USING PARTIAL RESPONSE METHOD

FIELD OF THE INVENTION

This invention relates to a digital signal recording-reproducing apparatus, and especially to a digital video recorder for recording on a metal evaporated tape (ME tape) by a rotary head.

In the field of technology of digital recording-reproducing using ME tape and rotary heads, this invention affords high signal to noise ratio, low error rate, and the possibility of high density digital recording by supplying a digital signal to rotary heads through an encoder, which encodes a signal by the method of class 4 partial-response, supplying a reproduced signal from ME tape by rotary heads to a decoder which decodes the reproduced signal, by the method of class 4 partial-response, and supplying an output signal of the decoder to a three level comparator.

BACKGROUND OF THE INVENTION

It is not possible to employ a method of channel coding for supressing the DC component of a signal, when high frequency data such as a digital video signal is to be recorded, because the margin of carrier to noise ratio (C/N) decreases.

For example, it is not possible to use a channel coding which increases the bit rate, such as a 8-10 conversion which converts 8 bits data to 10 bits data. A method of channel coding which has a density ratio (a ratio of minimum distance of reverse magnetization before modulation and after modulation) more than 1 has been suggested, but for 2-7 conversion, for example, it is difficult to make an integrated circuit because the frequency of the master clock is doubled.

An ME tape is suitable for high density recording, but it has the characteristic of lacking capability of recording and reproducing low frequency components (i.e., a low frequency lacking effect).

Moreover, it is difficult to transmit a DC component when a rotary head and a rotary transformer is used. As mentioned above, the low frequency components of transmitted data are lost. For compensating for a lost low frequency component, a phase equalizer was needed in a prior art integral-detection method.

However, it is not easy to adjust a phase equalizer for proper matching.

SUMMARY OF THE INVENTION

It is a principal object of this invention to offer a digital signal recording-reproducing apparatus from which a high signal-to-noise ratio for the reproduced signal is available, without using a phase equalizer, which is needed in an integral-detection method.

SUMMARY OF THE DRAWINGS

Reference will now be made to the accompanying drawings, in which.

DETAILED DESCRIPTION OF THE PREFERRED EMBODIMENT

This invention relates to a technique of supplying digital signals to a rotary head through a class 4 partial-response encoder, and supplying a reproduced signal to a three-level comparator through a class 4 partial-response decoder in a digital recording-reproducing apparatus, using ME tape and a rotary head.

A partial-response method can adapt characteristics of a transmission signal to the characteristics of a transmission line by adding intersymbol interference to the signal, intentionally.

In the technical field of recording and reproducing using a rotary head, a rotary transformer, and an ME tape, the frequency response of a reproduced signal accords with a frequency response of class 4 partial-response signal, in which the signal to noise ratio becomes higher, and the error rate becomes lower.

Figure 1:
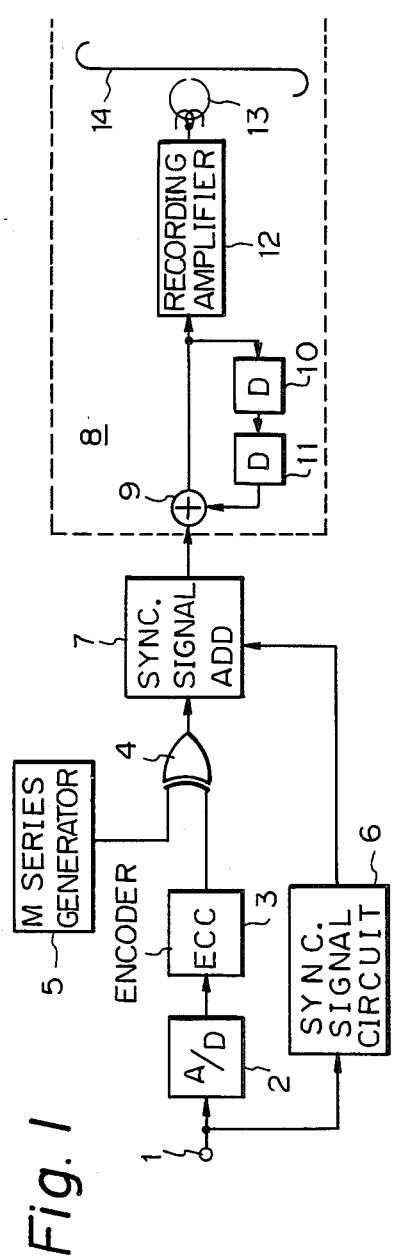
FIG. 1 is a schematic diagram of a recording circuit incorporating an illustrative embodiment of the invention.

One embodiment of a recording circuit is shown in FIG. 1. In FIG. 1, a video signal is supplied at an input terminal 1, and this signal is converted to a digital video signal by an analog to digital converter. The digital video signal is supplied to an error correction code (ECC) encoder 2, and is added with a parity signal of an error correction code. An output signal of the ECC encoder 3 is supplied to an exclusive OR gate 4. An M series signal from an M series generator 5 is supplied at the other input terminal of the exclusive OR gate 4. An M series signal scrambles the digital signal, and limits the quantity of DC in the resultant signal. A synchronous signal circuit 6 generates clock-timing signals for the recording circuit, and supplies them to a synchronous signal adding circuit 7. The digital signal is added with the synchronous signals, by the synchronous signal adding circuit 7, and the sum is supplied to a class 4 partial-response encoder 8. This encoder 8 comprises a modulo-2 adder 9, delay units 10 and 11 having a delay duration equal to one clock period. One input terminal of the adder 9 is connected to an output of the synchronous signal adding circuit 7, and an output terminal of the adder 9 is connected to a rotary head 13 through a rotary transformer (not shown), after adjusting the level of recording current with a recording amplifier 12. The digital recording signal is recorded, in oblique tracks, on an ME tape 14 by the rotary head 13. A sendust spattered head is preferably used as the rotary head 13, because of strong coercive force of the ME tape 14.

In FIG. 1 (and in FIG. 2), the class 4 partial-response circuit is enclosed by broken lines. The term "partial-response" is a general term for a communication method which controls the frequency spectrum of a communication system to be adapted to some purpose by adding a removable intersymbol interference.

Figure 2:
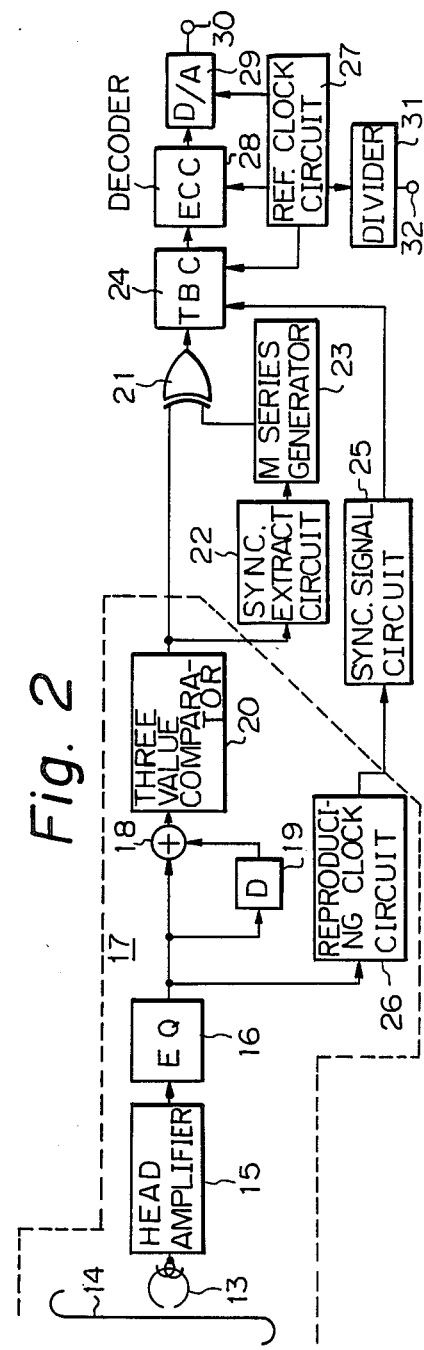
FIG. 2 is a schematic diagram of a reproducing circuit incorporating an illustrative embodiment of the invention.

A reproducing circuit corresponding to the recording circuit as shown in FIG. 1, is shown in FIG. 2. In FIG. 2, a reproduced signal from a rotary head 13 is supplied to a head amplifier 15 through a rotary transformer (not shown). Because the high frequency components of output signals of the head amplifier 15 are attenuated due to various losses, an equalizer 16 compensates the high frequency components of the signal. An output signal of the equalizer 16 is supplied to a class 4 partial-response decoder 17. The decoder 17 comprises an added 18 supplied with the reproduced signal at one input terminal from the equalizer 16, and a delay unit 19 delaying the reproduced signal by one clock period, and supplying it to the other input terminal of the adder 18. An output signal of this encoder 17 is supplied to three-value comparator 20.

Figure 3A:
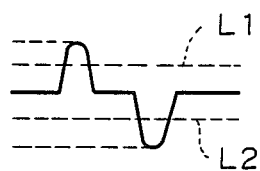
FIG. 3A and 3B are waveforms illustrating operation of the three-value comparator of FIGS. 1 and 2.
Figure 3B:

In the class 4 partial-response method, the number of received levels corresponding to input digital signal of the binary code is three (1, 0, −1) as shown in FIG. 3A. The three-value comparator 20 generates binary coded data as shown in FIG. 3B by slicing the reproduced digital signal at slice levels L1 and L2 as shown in FIG. 3A, and producing an output whenever the signal is outside the interval between the two slice levels.

Output data of the three-value comparator 20 are supplied to one of the input terminals of an exclusive OR gate 21 and to a synchronous signal extracting circuit 22. Synchronous signals from the synchronous signal extracting circuit 22 are supplied to an M series signal generator 23, which generates M series signals synchronized with the reproduced digital signal. Supply of the M series signals to the other input terminal of the exclusive OR gate 21 performs a descrambling procedure for the reproduced digital signals.

The output signal of the exclusive OR gate 21 is supplied to a time base corrector (TBC) 24, which comprises a digital memory. The clock signals from a synchronous signal circuit 25 are used when the reproduced digital signal is written in the digital memory of the TBC. Reproduced clock signals generated by a clock reproducing circuit 26, comprising a PLL circuit, are supplied to the synhronous signal circuit 25. Therefore, a writing clock of the TBC 24 is synchronized to the reproduced digital signal.

The reproduced digital signal from the TBC 23 is read by a reading clock from a reference clock circuit 27. An Error Correction Code decoder 28 corrects error signals of time range compensated reproduced digital signals obtained from the TBC 24. A digital-to-analog converter 29 converts the output digital signal from the ECC decoder 28 to an analog video signal, and a reproduced video signal appears at an output terminal 30. Clock signals and timing signals generated by the reference clock circuit 27 are supplied to the ECC decoder 28 and to the D/A converter 29. A 60 Hz servo reference signal is generated by a divider circuit 31 and supplied to an output terminal 32.

A series of partial-response type has been proposed, in which the value of the signal becomes zero smoothly at a Nyquist frequency, and they are classified as class 1 to class 5, according to the term. The class 4 partial-response signal responds to value of (1, 0, −1) having a frequency response in which a value is zero at both a Nyquist frequency and at the the DC level.

In one embodiment of this invention, the encoder 8 of the recording circuit has a transfer function $1/1-D^2$. The transfer function of the head and tape division is $1-D$ because it uses a differential method. A decoder 17 at the reproducing circuit has a transfer function $1+D$. Therefore, the total transfer function of the recording-reproducing circuit is 1, as shown by the following formula:

$$(1/1-D^2) \times (1-D) \times (1+D) = 1$$

Figure 4:
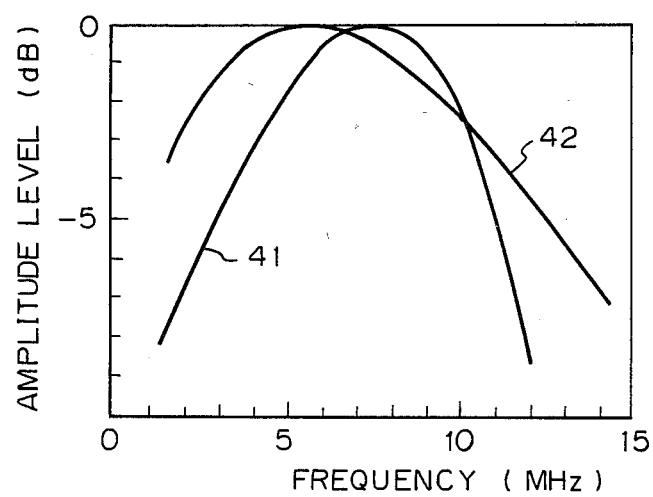
FIG. 4 is a graph showing frequency response.

In FIG. 4, a recognition port of class 4 partial-response (viz., the output of the decoder 17), in which the transfer rate is 30 MBPS (Mega Bits Per Second), is shown by the line 41. Also, the frequency response of an output of the head is shown by the line 42, where the relative velocity of the head and the tape is 7.5 m/s. It is apparent that the spectrum 41 matches well with the frequency response 42 of the head. This invention can be applied to a digital recording besides a digital video signal, for example, a digital audio signal.

In this invention the frequency response of an output signal reproduced from ME tape by a rotary head matches the spectrum of class 4 partial-response, so that a high S/N ratio, a low error rate, and the possibility of high density digital recording are obtained from this invention.

It will be apparent that various modifications and/or additions may be made in the apparatus of the invention without departing from the essential features of novelty involved, which are intended to be defined and secured by the appended claims.

What is claimed is:

1. In a digital recording-reproducing apparatus for recording and reproducing a digital signal on a metal evaporation tape by a rotary head, the combination comprising:

a recording circuit for supplying a digital signal to said rotary head, said recording circuit including a class 4 partial-response encoder, an analog-to-digital converter for converting an input analog signal to a corresponding digital signal, and an M series signal generator for scrambling said digital signal; and a reproducing circuit supplied with a reproduced signal from said rotary head, said reproducing circuit including a class 4 partial-response decoder, a three-level comparator supplied with an output signal of said class 4 partial-response decoder, and a digital-to-analog converter for converting a digital signal obtained from said three-level comparator.

2. A digital recording-reproducing apparatus according to claim 1, in which said reproducing circuit includes a time base corrector connected between said three level comparator and said digital-to-analog converter.

* * * * *